United States Patent
Schäfer et al.

(10) Patent No.: US 12,343,796 B2
(45) Date of Patent: Jul. 1, 2025

(54) ADDITIVE MANUFACTURING SYSTEM FOR POWDERY STARTING MATERIAL AND METHOD FOR MANUFACTURING A COMPONENT

(71) Applicant: ALD VACUUM TECHNOLOGIES GMBH, Hanau (DE)

(72) Inventors: Karsten Schäfer, Hünfeld (DE); Arno Niebling, Linsengericht (DE); Fuad Osmanlic, Seligenstadt (DE)

(73) Assignee: ALD VACUUM TECHNOLOGIES GMBH, Hanau (DE)

( * ) Notice: Subject to any disclaimer, the term of this patent is extended or adjusted under 35 U.S.C. 154(b) by 0 days.

(21) Appl. No.: 17/921,229

(22) PCT Filed: Feb. 26, 2021

(86) PCT No.: PCT/EP2021/054933
§ 371 (c)(1),
(2) Date: Oct. 25, 2022

(87) PCT Pub. No.: WO2021/219274
PCT Pub. Date: Nov. 4, 2021

(65) Prior Publication Data
US 2023/0166331 A1    Jun. 1, 2023

(30) Foreign Application Priority Data
Apr. 27, 2020    (DE) .................... 10 2020 111 460.5

(51) Int. Cl.
B22F 12/00 (2021.01)
B22F 10/25 (2021.01)
(Continued)

(52) U.S. Cl.
CPC .............. *B22F 10/25* (2021.01); *B22F 12/30* (2021.01); *B22F 12/38* (2021.01); *B22F 12/41* (2021.01);
(Continued)

(58) Field of Classification Search
CPC .... B22F 10/25; B22F 2201/20; B29C 64/255; B29C 64/25; B29C 64/268; B29C 64/153; B33Y 30/00
See application file for complete search history.

(56) References Cited

U.S. PATENT DOCUMENTS

2013/0112899 A1* 5/2013 Schulz ...................... E06B 5/18
250/517.1
2016/0368054 A1* 12/2016 Ng .......................... B33Y 50/02
(Continued)

FOREIGN PATENT DOCUMENTS

EP    3189960 A1    7/2017
GB    987296 A    3/1965
(Continued)

OTHER PUBLICATIONS

Banerjee (Refractory Metals and Alloys, 2016) (Year: 2016).*
(Continued)

*Primary Examiner* — James M Mellott
*Assistant Examiner* — Erica Hartsell Funk
(74) *Attorney, Agent, or Firm* — Barnes & Thornburg LLP; Ryan L. Marshall

(57) ABSTRACT

The present invention relates to an additive manufacturing system for powdery starting material which comprises electron beam guns as irradiation units. The system comprises an improved shielding against ionizing radiation, in particular x-rays. By use of the additive manufacturing system according to the invention a compact an lightweight shielding of the construction area is achieved.

20 Claims, 3 Drawing Sheets

(51) Int. Cl.
  *B22F 12/30* (2021.01)
  *B22F 12/41* (2021.01)
  *B22F 12/63* (2021.01)
  *B22F 12/67* (2021.01)
  *B33Y 10/00* (2015.01)
  *B33Y 30/00* (2015.01)

(52) U.S. Cl.
  CPC .............. *B22F 12/63* (2021.01); *B22F 12/67* (2021.01); *B33Y 10/00* (2014.12); *B33Y 30/00* (2014.12); *B22F 2201/20* (2013.01)

(56) References Cited

U.S. PATENT DOCUMENTS

2018/0311759 A1 11/2018 Ackelid et al.
2019/0049937 A1* 2/2019 Tetiker ................ H01L 21/3065

FOREIGN PATENT DOCUMENTS

| GB | 201813256 | * | 9/2018 | ............... G21F 1/12 |
|---|---|---|---|---|
| JP | 2020033580 | A | 3/2020 | |
| JP | 2020514550 | A | 5/2020 | |
| WO | 2016118989 | A1 | 8/2016 | |
| WO | 2018197551 | A1 | 11/2018 | |
| WO | 2019185642 | A1 | 10/2019 | |

OTHER PUBLICATIONS

English Translation of International Search Report dated Jun. 9, 2021, prepared in International Application No. PCT/EP2021/054933.

International Preliminary Report on Patentability dated Nov. 10, 2021, prepared in International Application No. PCT/EP2021/054933.

* cited by examiner

ADDITIVE MANUFACTURING SYSTEM FOR POWDERY STARTING MATERIAL AND METHOD FOR MANUFACTURING A COMPONENT

This application is a National Stage application of International Application No. PCT/EP2021/054933, filed Feb. 26, 2021. This application also claims priority under 35 U.S.C. § 119 to German Patent Application No. 10 2020 111 460.5, filed Apr. 27, 2020.

The present invention relates to an additive manufacturing system for powdery starting material comprising electron beam guns as irradiation units. The system comprises an improved shielding from ionizing radiation, in particular X-rays.

PRIOR ART

Devices and methods for additive manufacturing of workpieces, also known under the term additive manufacturing (AM), are known from the prior art. One also speaks of "generative manufacturing processes" or "3D printing". The raw material can be in powder form or liquid. The powder processes include, for example, Selective Laser Melting (SLM), Selective Laser Sintering (SLS) or Electron Beam Melting (EBM). The raw material consists of plastics or metals.

In the case of processes that work with a raw material in powder form, the material is applied in the form of a layer onto a lowerable work surface in order to be melted or sintered there in sections. Then the work surface is lowered by one layer thickness. Another layer is then applied onto the layer and the same procedure as for the first layer is repeated. The sections to be melted or sintered are selected so that the three-dimensional workpiece is built up layer-wise.

The systems, which work according to the Electron Beam Melting (EBM) process, use one or more electron beam guns as a radiation source, in contrast to the laser processes. Since, in using these, when the electron beam hits onto the powder surface, X-rays are generated in addition to the desired heat, these systems must be shielded against ionizing radiation. In order to shield from ionizing radiation and, in particular, X-rays, the system walls are usually laboriously provided with claddings predominantly made of lead or also steel. In order to be able to reliably absorb the ionizing radiation, a corresponding minimum thickness of these claddings is required. This makes the systems very heavy and accordingly difficultly to maintain. Apart from that, the thick claddings also cause considerable costs. In addition, lead is physiologically questionable.

OBJECT

Proceeding from these problems, it was an object of the present invention to provide an additive manufacturing system comprising electron beam guns by means of which the disadvantages of the devices of the prior art are overcome. In particular, it was the object of this invention to provide a device which can be implemented with smaller and lightweight dimensioned shieldings without impairing the construction process, as well as to provide a method for producing components therewith.

DESCRIPTION OF THE INVENTION

This object is achieved with an additive manufacturing system according to claim 1 and a method for producing a component according to claim 11. Preferred embodiment variants are subject matter of the dependent claims.

An additive manufacturing system according to the invention for powdery starting material includes
  a vacuum chamber comprising
    at least one construction area with a construction platform,
    at least one powder reservoir arranged to the side of the construction area,
    at least one powder application element, which is arranged horizontally movably between the at least one powder reservoir and the at least one construction platform for distributing powdery starting material from the at least one powder reservoir on the at least one construction platform, wherein the powder application element traverses the construction area at least once for each powder distribution process, and
    at least one electron beam gun associated to the at least one construction area,
  and is characterized in that
    the at least one construction area is surrounded by a shielding against ionizing radiation, which comprises four walls, two of which can be formed by walls of the vacuum chamber,
    the walls of the shielding at least on the two sides in the direction of movement of the at least one powder application element consist of an upper part and a lower part,
    wherein
      the upper part is rigidly connected to the vacuum chamber, is formed from 2-11 horizontally spaced metal sheets and has a clear height above the construction platform that allows the powder application element to move horizontally through the construction area, and
      the lower part is connected to a vertically movable frame and is formed from 2-11 horizontally spaced refractory metal sheets which are arranged in a meshing manner with the metal sheets of the upper part and are attached to the movable frame in a radiopaque manner, and
    the lower part is movable relative to the upper part in the vertical between a closed position and an open position, wherein the refractory metal sheets of the lower part
      in the closed position are arranged such that their lower edges mesh with a groove structure on the surface of the construction area while forming a labyrinth structure and such that their upper edges mesh with the metal sheets of the upper part while forming a labyrinth structure, and
      come to rest between the metal sheets of the upper part in the open position to such an extent that they allow the horizontal movement of the powder application element through the construction area.

The additive manufacturing system according to the invention can be equipped with several electron beam guns that cover individual areas of a larger construction platform, or it can also be equipped with several construction platforms, to each of which one or more electron beam guns are associated. The latter setup offers the advantage that in this case only a single vacuum chamber has to be evacuated.

In the context of this application, the construction area is understood to mean the area within the vacuum chamber of the additive manufacturing system in which the construction platform is disposed, on which the powdery starting material is bombarded with the electron beam and thus the component is built.

The powder application element can be, for example, a doctor blade or an application roller. The powder provided from the powder reservoir for the next layer of the component is evenly distributed by the powder application element on the surface of the construction platform or on the layers already disposed thereon. To this end, the powder application element travels once through the entire construction area. The movement takes place at least up to the end of the construction platform, but generally up to an end position completely at the opposite wall, since a collecting container for excess powder or another powder reservoir is usually attached there. As a result, it is not possible to attach any installations in the area of movement of the powder application element, in particular above the construction platform. However, this is the site where the X-ray radiation originates, which occurs when the electron beam hits onto the powder surface.

In the additive manufacturing system according to the invention, this problem is solved in that a shielding against ionizing radiation that can be raised synchronously with the movement of the powder application element is used directly around the construction area. It is therefore not necessary to provide the entire outer walls of the system with a shielding, but much smaller shielding surfaces are sufficient, since these are arranged closer to the point of origin of the radiation. In this way, a considerable amount of weight can be saved simply by reducing the surface area.

However, in this case there is still the problem that considerable masses would have to be moved if the shielding surfaces of the outer walls were simply designed in the same way only reduced in size. In addition to the mechanical stress, which would then require a correspondingly stable mechanism, the construction process would also be slowed down, since the movement of the heavy masses cannot take place as quickly as normally the movement time of the powder application element.

To solve this problem, the inventive shielding against ionizing radiation is not made from a solid plate that has to be moved completely and would then also require a vacuum-tight passage in the ceiling of the vacuum chamber. Instead, the shielding is divided into two parts, with an upper part fixed to the ceiling of the vacuum chamber and a movable lower part. As a result, only that part needs to be moved which is located in the range of movement of the powder application element. In addition, the solid sheet is replaced by a number of thin sheets that are spaced so far apart that the sheets of the upper part and the lower part can be moved in a meshing manner. This meshing arrangement, which forms a labyrinth structure, ensures that there is no direct beam path, but the radiation is reflected several times at the meshing metal sheets and is thus slowed down.

Furthermore, the sheet of the movable lower part is made of a refractory metal. When "refractory metal sheets" are spoken of in this application, this is to be understood as sheets made of mixtures or alloys that contain more than 50% by weight, for example more than 60% by weight, more than 70% by weight, more than 80% by weight, more than 90% by weight, more than 95% by weight, in particular more than 99% by weight, of refractory metals. Refractory metals are in turn to be understood in the context of this application as the high melting metals titanium, zirconium, hafnium, vanadium, niobium, tantalum, chromium, molybdenum and tungsten. In addition to the high melting point, these are mainly characterized by a high density and, above all, a high specific absorption coefficient for ionizing radiation. In this way, shielding performances comparable to that of the conventional thick lead or steel layers on the outer walls can be achieved with thinner sheets. Here, the advantage of the higher temperature resistance of the refractory metals, especially compared to lead, is very important, which means that the shielding can be moved closer to the point of radiation and therefore requires less surface area. In addition, lead has inadequate mechanical stability, which prevents it from being attached in sheet form to a movable frame already without increased temperatures for mechanical reasons alone. Steel offers better stability here, but would also have to be made thicker and therefore heavier, as its absorption coefficient is lower.

The refractory metal sheets of the lower part preferably consist of tungsten, molybdenum, rhenium, tantalum and/or mixtures or alloys thereof. Tungsten, molybdenum, tantalum and/or mixtures or alloys thereof are particularly preferred. Alloys and mixtures can preferably be made with copper.

The upper part of the shield, which does not need to be moved, does not necessarily have to consist of refractory metals, but can also consist of other metals for reasons of cost. However, if the vacuum chamber is kept very low or if very high temperatures have to be generated due to the metal powder being processed, it may still be desirable to manufacture the sheets of the upper part from refractory metals, too. In this case, the same refractory metals as for the lower part can be used. In design variants, the metal sheets of the upper part consist of stainless steel, copper, refractory metals and/or mixtures or alloys thereof.

It has proven to be advantageous to design the individual sheets of the upper part from the outside to the inside with a decreasing length. In this case, the lower edges are aligned evenly so that the upper edges are offset in steps. This makes it easier to attach the metal sheets to the vacuum chamber ceiling.

The number of sheets for the upper part and the lower part are to be determined dependent on the power of the electron beam guns and the ionizing radiation generated therewith and the metal used. Depending on the absorption capacity of the selected metal, 2-11 sheets have proven to be optimal. For safety reasons, the number of sheets should preferably be chosen so that one more sheet is always installed than is necessary for shielding.

For reasons of cost, the shielding can preferably be produced from individual refractory metal sheet parts which are commercially available in standard sizes. At least two joints are advantageously provided in each layer of refractory metal sheets. At the joints within the upper and/or lower part, the sheets do not overlap in order to avoid tilting caused by distortion due to thermal expansion. The individual sheets can have a gap of up to 50 mm, up to 40 mm, up to 30 mm or up to 20 mm at the joints. The gap is preferably 5 mm to 25 mm, most preferably 10 mm to 20 mm. The joints between two successive layers of refractory metal sheets within the upper and/or lower part are respectively not arranged aligned in order to avoid a free beam path.

The refractory metal sheets of the lower part preferably each have a thickness of 0.1 to 20 mm. The thickness of the sheets can be 0.1-20 mm, 0.5-15 mm, 1-10 mm, 2-8 mm or 3-6 mm. The thickness can in particular be at most 20 mm, at most 15 mm, at most 10 mm, at most 8 mm or at most 6 mm. In particular, it can be at least 0.1 mm, at least 0.5 mm, at least 1 mm, at least 2 mm or at least 3 mm.

In addition to the refractory metal sheets, the lower part can also comprise one or two stainless steel sheet layers as the innermost layers as an additional heat protection. These can then also be arranged as a double layer at a smaller distance from one another than the refractory metal sheets. The stainless steel sheets primarily contribute to heat protection, but also to a lesser extent to radiation protection. This measure protects the more expensive refractory metal sheets from heat such that they have a longer lifetime. The cheaper stainless steel sheets, on the other hand, can be replaced more often.

The metal sheets of the upper part preferably each have a thickness of 1 to 100 mm. The thickness of the metal sheets can be 1-100 mm, 2-75 mm, 3-50 mm, 4-25 mm or 5-15 mm. The thickness can in particular be at most 100 mm, at most 75 mm, at most 50 mm, at most 25 mm or at most 15 mm. In particular, it can be at least 1 mm, at least 2 mm, at least 3 mm, at least 4 mm or at least 5 mm. The thickness of the metal sheets of the upper part is preferably designed to match the refractory metal sheets of the lower part, so that the upper part and the lower part absorb approximately the same amount of radiation. The metal sheets in the upper part do not necessarily have to have a uniform thickness. For example, they can also be made thicker at the outside of the stack of sheets than at the inside.

Most preferably, the refractory metal sheets of the lower part and the metal sheets of the upper part each have a spacing of 1 mm to 50 mm from one another when they mesh. Thus, the distance between the refractory metal sheets is, for example, 1 mm+the thickness of the metal sheets in the upper part+1 mm. In any case, the distance between the sheets should be much smaller than the height of the sheets in order to reliably represent a radiation trap. The distance between the sheets should in particular be at most half as large as the distance over which the upper part and lower part are in meshing engagement in the closed state. In this way, the multiple reflections can be maximized in the generated ray labyrinth.

Corresponding grooves are formed on the top surface of the construction area, into which the lower edges of the sheets of the lower part of the shielding engage in the same way as their upper edges in the lower edges of the sheets of the upper part in the closed state of the shielding. Thus, a labyrinth is also created at the bottom side of the lower part of the shielding, which prevents radiation from escaping.

In one embodiment, the refractory metal sheets of the lower part have a density of more than 10 g/cm³ (at 20° C.).

The shielding against ionizing radiation can be constructed in two different ways. In any case, it comprises four walls that surround and thus shield the construction area. Two of these walls can be formed by the outer walls of the vacuum chamber, which are then provided with a shielding material in a usual way. This material can also be usual materials such as lead and steel, but preferably no lead is used, but refractory metals or steel. In this case, these two walls are the walls of the shielding which do not lie in the direction of movement of the powder application element. The walls lying in the direction of movement of the powder application element are then designed in the two-part form with an upper part and a lower part, so that the shielding can be raised in order to allow the powder application element to pass.

However, it is more preferable to use four separate walls for the shielding. This creates the smallest distance to the point of radiation at all sides, so that the smallest surface area and mass of shielding materials have to be used.

Most preferably, all four walls of the shielding consist of an upper part and a lower part. This is particularly advantageous because with two fixed walls not every type of powder application elements or their drives are possible. If, for example, as in the case of a doctor blade, these are laterally guided and/or driven, all four walls must be raised in order to enable the doctor blade to pass over the construction area. There is thus greater freedom of design for the powder application element.

In design variants, the radiopaque attachment of the refractory metal sheets of the lower part to the movable frame comprises a spacer bolt fastening which has two different diameters. The first diameter is dimensioned to match the hole in the refractory metal sheets. The second diameter that the spacer bolts have outside of the hole is larger in such that the radiation on the way through the hole is shielded by the spacer bolt in the same way as by the refractory metal sheet in the non-perforated area.

In preferred design variants, the powder application element is a doctor blade or a roller.

The method according to the invention for producing a component by use of an additive manufacturing system includes the steps
a) providing an additive manufacturing system according to the invention,
b) providing powdery starting material in the at least one powder reservoir and evacuating the vacuum chamber,
c) moving the lower part of the shielding to the open position,
d) distributing powdery starting material from the at least one powder reservoir on the at least one construction platform by horizontally moving the powder application element between the at least one powder reservoir and the at least one construction platform with at least one complete traverse of the construction area,
e) moving the lower part of the shielding to the closed position,
f) producing a layer of the component by irradiating the powdery starting material with the at least one electron beam gun,
g) repeating steps c) to f) until the component is finished.

Depending on the design of the powder application element and the application process, the powder layer can be applied in a simple one-time movement or in a reciprocating movement. In the latter case, the shielding remains open until the powder application element has returned to its starting position after the second movement. Only then the shield is lowered and the irradiation is started.

The irradiation takes place exclusively with the shielding closed. As long as the shielding is open, the electron guns are deactivated.

DESCRIPTION OF THE FIGURES

The figures only show a preferred embodiment variant as an example of the invention. They are therefore not to be understood as restrictive.

Figure 1:
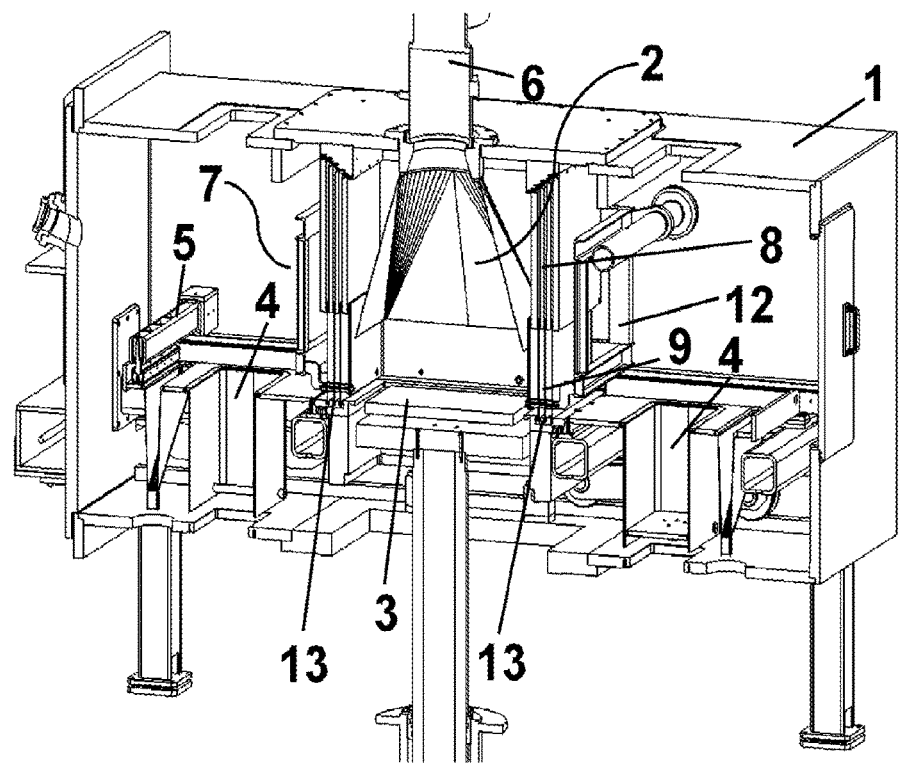
FIG. 1 is a perspective sectional view of an additive manufacturing system according to the invention in the closed state in the starting position.

FIG. 1 shows a perspective sectional view of an additive manufacturing system according to the invention. In the vacuum chamber (1) a construction area (2) is disposed in which a single construction platform (3) is disposed. This is shown in the upper starting position at the start of construction. To the left and right of the construction area (2) there is a respective powder reservoir (4) with an adjoining slot for receiving excess powder. The powder application element (5), in this example a doctor blade that is suspended from a movable traverse, conveys an amount of powder from the powder reservoir (4) onto the construction platform (3) in the construction area (2), which is slightly larger than is required for one layer of the component, so that it can be ensured that the entire surface of the construction platform (3) is coated evenly. Excess powder is conveyed beyond the opposite powder reservoir (4) into the slot and from there it reaches a collecting container. In FIG. 1, the powder application element (5) is in the left starting position.

Figure 2:
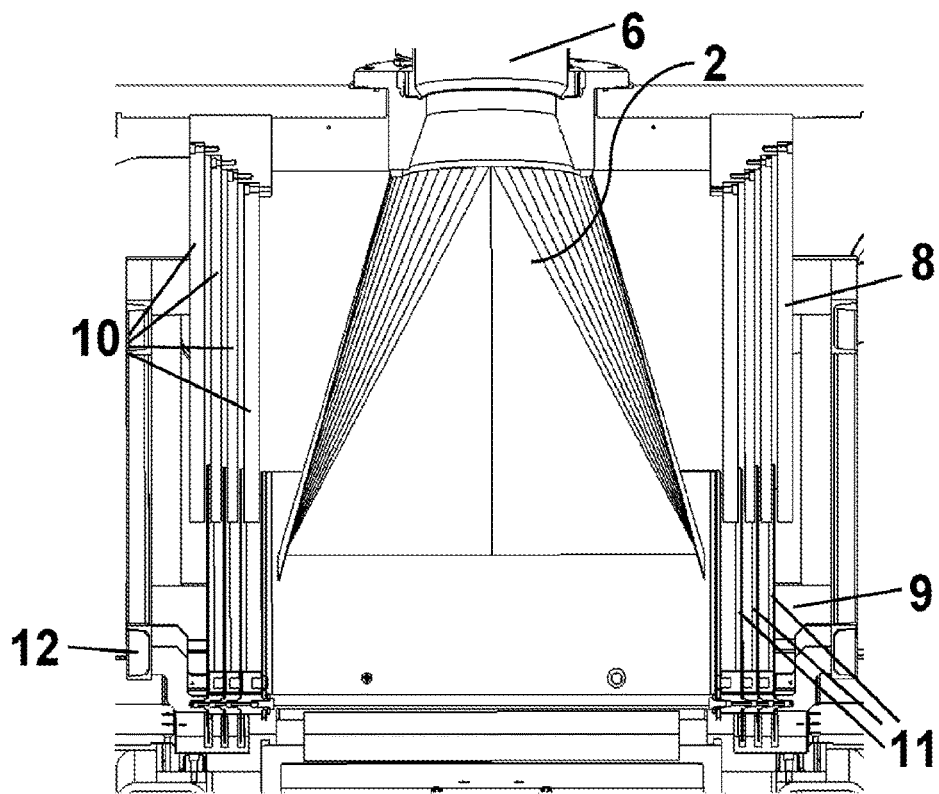
FIG. 2 is a perspective sectional view of the construction area surrounded by the shielding.

An electron beam gun (6) is embedded in the ceiling of the vacuum chamber (1) above the construction area (2). The entire construction area (2) is surrounded on all four sides by a shielding (7) which consists of an upper part (8) and a lower part (9). The shielding (7) is in the closed state because the powder application element (5) is still in the starting position. FIG. 2 again shows an enlarged view of the construction area (2) surrounded by the shielding (7). In the example shown here, the upper part (8) consists of four metal sheets (10) made of stainless steel with a thickness of 30 mm at the outside and 20 mm at the inside in a distance of 13 mm. The lower part (9) consists of three refractory metal sheets (11) made of pure tungsten with a thickness of 3 mm in a distance of 30 mm. The density of the refractory metal sheets (11) is therefore 19.25 g/cm$^3$. The refractory metal sheets (11) of the lower part (9) are arranged in a meshing manner in the metal sheets (10) of the upper part (8) and overlap with them by 45 mm.

The metal sheets (10) of the upper part (8) are each dimensioned somewhat shorter from the outside towards the construction area (2). This makes it easier to attach them by means of the bolts to the stepped mounting at the ceiling of the vacuum chamber (1). The refractory metal sheets (11) are attached to the movable frame (12) and can be raised above it. In the closed position shown here, their lower edges engage into a groove structure (13) which forms the edge area of the construction area (2). The groove structure (13) is dimensioned similarly to the structure of the upper part, i.e. in the present example, grooves of 13 mm width are milled at a distance of 20 mm around the construction platform (3) in the surface of the vacuum chamber (1), since the grooves correspond to the distances between the sheets and the webs remaining in between correspond to the thickness of the sheets.

Figure 3:
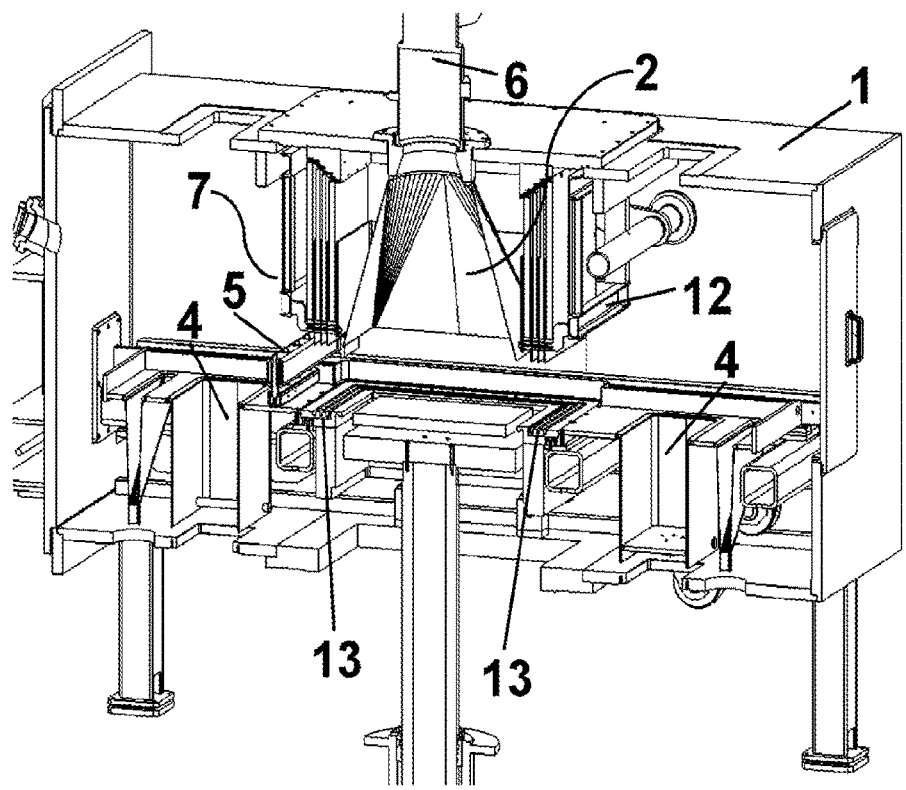
FIG. 3 is a perspective sectional view of the system of FIG. 1 in the open state with the powder application element before entering the construction area.

To produce a component, the powder reservoirs (4) are filled with a powdery starting material, for example with titanium powder, the system is moved to the starting position shown in FIG. 1 and the vacuum chamber (1) is evacuated. To produce the first layer of the component, titanium powder is then conveyed by use of the powder application element (5) from the powder reservoir (4) towards the construction area (2). Either immediately before the powder application element (5) starts moving or when it has almost reached the closed shielding (7), its lower part (9) is raised by means of the movable frame (12) and pushed into the upper part (8), so that the range of movement of the powder application element (5) is enabled. The electron beam gun (6) is deactivated during this time. This situation is shown in FIG. 3.

There, with the shielding (7) in the open state, the groove structure (13) can now also be clearly seen.

Figure 4:
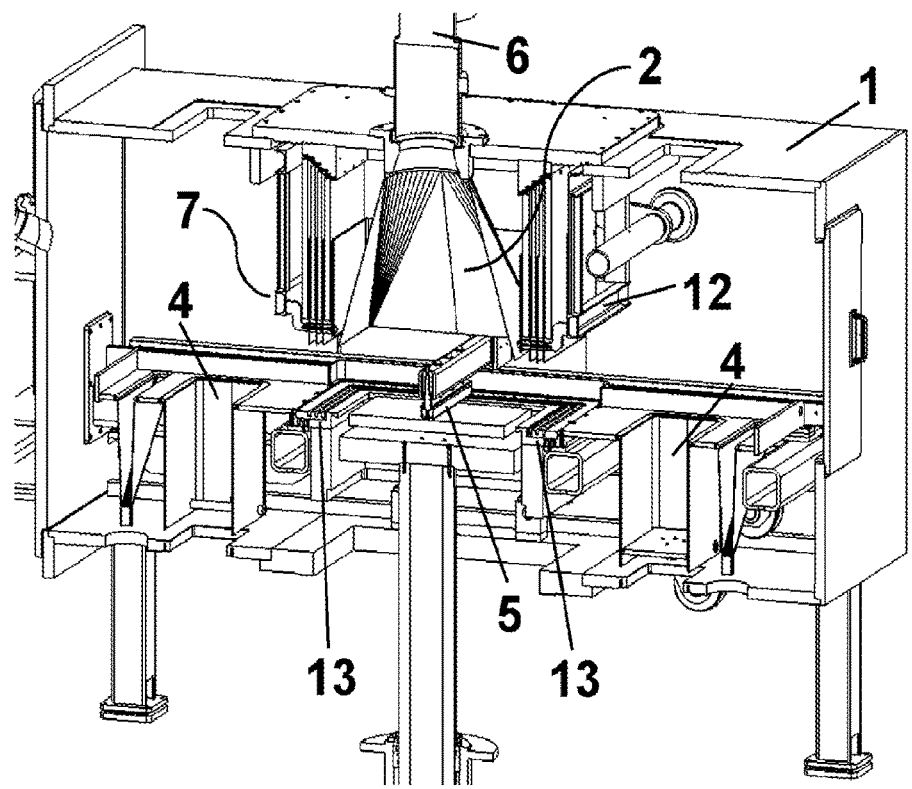
FIG. 4 is a perspective sectional view of the system of FIG. 1 in the open state with the powder application element within the construction area.
Figure 5:
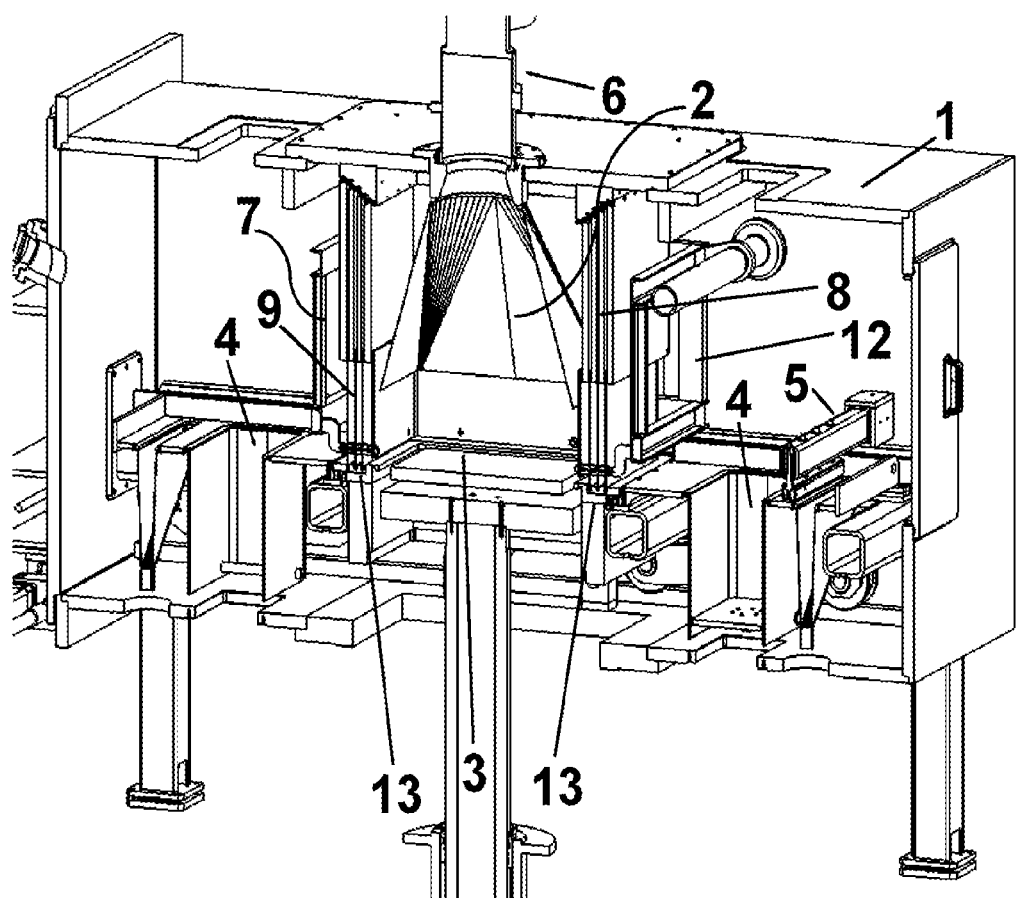
FIG. 5 is a perspective sectional view of the system from FIG. 1 in the closed state after the powder application element has left the construction area again.

FIG. 4 shows the powder application element (5) as it traverses the construction area (2) and distributes the titanium powder on the construction platform (3). FIG. 5 shows the powder application element (5) immediately after traversing the construction area (2). As soon as the powder application element (5) has left the construction area (2) again, the lower part (9) is lowered again into the closed position. The lower edges of the refractory metal sheets (11) again engage into the groove structure (13). The powder application element (5) then moves on to the end position behind the right powder reservoir (4) and thus discharges excess titanium powder into the collecting slot. As soon as the shielding (7) is closed again, the electron gun (6) can be activated and start writing the layer data for the first layer.

After the first layer has been written, the process begins again in the other direction. In systems in which only one powder reservoir (4) is installed, the powder application element (5) can either remain in the position beyond the construction area (2) until the layer is written and the lower part (9) of the shielding (7) is raised again and only then move back to the starting position to take new powder, or immediately after traversing the construction area (2) move back to the starting position in a reciprocating movement before the shielding (7) is closed.

LIST OF REFERENCE SYMBOLS

1 Vacuum chamber
2 Construction area
3 Construction platform
4 Powder reservoir
5 Powder application element
6 Electron beam gun
7 Shielding
8 Upper part
9 Lower part
10 Metal sheet
11 Refractory metal sheet
12 Frame
13 Groove structure

The invention claimed is:

1. An additive manufacturing system for powdery starting material, including
a vacuum chamber comprising
at least one construction area with a construction platform;
at least one powder reservoir arranged to a side of the construction area;
at least one powder application element, which is arranged horizontally movably between the at least one powder reservoir and the at least one construction platform for distributing powdery starting material from the at least one powder reservoir on the at least one construction platform, wherein the powder application element traverses the construction area at least once for each powder distribution process; and
at least one electron beam gun for each of the at least one construction areas;
characterized in that
the at least one construction area is surrounded by a shielding against ionizing radiation, which comprises four walls, two of which can be formed by walls of the vacuum chamber; and the walls of the shielding at least on two sides in the direction of movement of the at least one powder application element consist of an upper part and a lower part, wherein the upper part is rigidly connected to the vacuum chamber, is formed from 2-11 horizontally spaced metal sheets and has a clear height above the construction platform that allows the powder application element to move horizontally through the construction area, and the lower part is connected to a vertically movable frame and is formed from 2-11 horizontally spaced refractory metal sheets which are arranged in a meshing manner with the metal sheets of the upper part and are attached to the movable frame in a radiopaque manner; and the lower part is movable relative to the upper part in the vertical between a closed position and an open position, wherein the refractory metal sheets of the lower part in the closed position are arranged such that their lower edges mesh with a groove structure on a surface of the construction area while forming a first labyrinth structure and are arranged such that their upper edges mesh with the metal sheets of the upper part while forming a second labyrinth structure; and come to rest between the metal sheets of the upper part in the open position at least to such an extent that they allow the horizontal movement of the powder application element through the construction area.

2. The additive manufacturing system according to claim 1, characterized in that the refractory metal sheets of the lower part have a density of more than 10 g/cm$^3$ at 20° C.

3. The additive manufacturing system according to claim 1, characterized in that the refractory metal sheets of the lower part consist of tungsten, molybdenum, rhenium, tantalum and/or mixtures or alloys thereof.

4. The additive manufacturing system according to claim 1, characterized in that the metal sheets of the upper part consist of stainless steel, copper, refractory metals and/or mixtures or alloys thereof.

5. The additive manufacturing system according to claim 1, characterized in that all four walls of the shielding consist of an upper part and a lower part.

6. The additive manufacturing system according to claim 1, characterized in that the radiopaque attachment of the refractory metal sheets of the lower part at the movable frame comprises a spacer bolt fastening which has two different diameters, wherein the first diameter is dimensioned to match the bore in the refractory metal sheets and the second diameter, which the spacer bolts have outside the bore, is larger in such a way that the radiation on the way through the bore is shielded by the spacer bolt in the same way as by the refractory metal sheet in the non-perforated area.

7. The additive manufacturing system according to claim 1, characterized in that the refractory metal sheets of the lower part each have a thickness of 0.1 to 20 mm.

8. The additive manufacturing system according to claim 1, characterized in that the metal sheets of the upper part each have a thickness of 1 to 100 mm.

9. The additive manufacturing system according to claim 1, characterized in that the refractory metal sheets of the lower part and the metal sheets of the upper part each have a spacing of 1 to 50 mm relative to each other in meshing engagement.

10. The additive manufacturing system according to claim 1, characterized in that at least two joints are provided in each layer of refractory metal sheets of the upper part and/or the lower part which have a gap of up to 50 mm.

11. The additive manufacturing system according to claim 10, characterized in that the joints of two successive layers of refractory metal sheets within the upper part and/or the lower part are each arranged out of alignment.

12. The additive manufacturing system according to claim 1, characterized in that the powder application element is a doctor blade or a roller.

13. The additive manufacturing system according to claim 11, characterized in that the powder application element is a doctor blade or a roller.

14. The additive manufacturing system according to claim 5, characterized in that the radiopaque attachment of the refractory metal sheets of the lower part at the movable frame comprises a spacer bolt fastening which has two different diameters, wherein the first diameter is dimensioned to match the bore in the refractory metal sheets and the second diameter, which the spacer bolts have outside the bore, is larger in such a way that the radiation on the way through the bore is shielded by the spacer bolt in the same way as by the refractory metal sheet in the non-perforated area.

15. The additive manufacturing system according to claim 5, characterized in that the refractory metal sheets of the lower part each have a thickness of 0.1 to 20 mm.

16. The additive manufacturing system according to claim 5, characterized in that the metal sheets of the upper part each have a thickness of 1 to 100 mm.

17. The additive manufacturing system according to claim 5, characterized in that the refractory metal sheets of the lower part and the metal sheets of the upper part each have a spacing of 1 to 50 mm relative to each other in meshing engagement.

18. The additive manufacturing system according to claim 5, characterized in that at least two joints are provided in each layer of refractory metal sheets of the upper part and/or the lower part which have a gap of up to 50 mm.

19. The additive manufacturing system according to claim 5, characterized in that the joints of two successive layers of refractory metal sheets within the upper part and/or the lower part are each arranged out of alignment.

20. A method for manufacturing a component by use of an additive manufacturing system including the steps a) providing an additive manufacturing system according to claim 1;

b) providing powdery starting material in the at least one powder reservoir and evacuating the vacuum chamber;

c) moving the lower part of the shielding into the open position;

d) distributing powdery starting material from the at least one powder reservoir on the at least one construction platform by horizontally moving the powder application element between the at least one powder reservoir and the at least one construction platform with at least one complete traversing of the construction area;

e) moving the lower part of the shielding into the closed position;

f) generating a layer of the component by irradiating the powdery starting material by means of the at least one electron beam gun; and
g) repeating steps c) to f) until the component is finished.

* * * * *